No. 836,891. PATENTED NOV. 27, 1906.
H. R. PROCTER.
MEASURING AND TRYING DEVICE.
APPLICATION FILED OCT. 28, 1905.
Fig. I.
Fig. II.
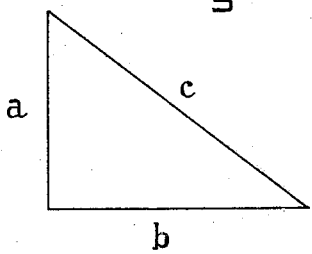
Fig. IV.
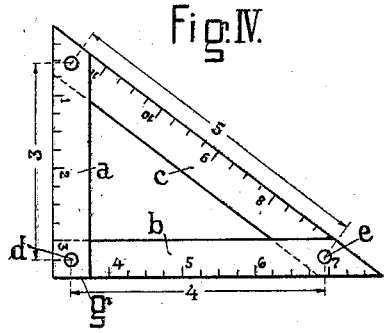
Fig. III.
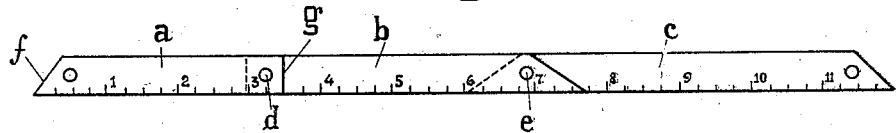
Fig. V.
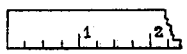
Fig. VI.
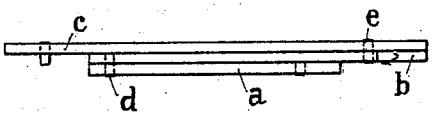
Witnesses,
E. F. Stewart
E. D. Pitney
Inventor,
Henry R. Procter,
by C. A. Snow & Co.
ATTORNEYS

UNITED STATES PATENT OFFICE.

HENRY RICHARDSON PROCTER, OF LEEDS, ENGLAND.

MEASURING AND TRYING DEVICE.

No. 836,891.　　　Specification of Letters Patent.　　　Patented Nov. 27, 1906.

Application filed October 28, 1905. Serial No. 284,911.

*To all whom it may concern:*

Be it known that I, HENRY RICHARDSON PROCTER, a subject of the King of Great Britain and Ireland, residing at The University, Leeds, in the county of York, England, have invented a new or Improved Measuring and Trying Device, of which the following is a specification.

My invention relates to a new or improved device by means of which short lengths may be measured and certain angles tried. It is based upon the well-known mathematical fact that a triangle having sides whose lengths are in the proportion of three, four, five is a true right-angled one. If, therefore, we take a rod or stick of any length and divide it into three pieces whose lengths have the proportions three, four, five and arrange these in the form of a triangle that triangle is a true right-angled one. To construct an instrument which will serve as a rule for measuring lengths and as a square for trying or drawing right angles, I take a strip of any suitable material and cut it into three pieces of such lengths that each shall have what I herein term a "proportional length" and what I herein term a "joint length." By the term "proportional length" I mean that length of each piece which is necessary to constitute the right-angled triangle, and by the term "joint length" I mean that length of a piece which is used for the purpose of jointing the pieces together and which length is additional to and extends beyond the proportional length.

In the accompanying drawings, Figures I and II are diagrams illustrating the principle on which my invention is based. Fig. III shows a preferred form of my instrument in its extended position for measuring lengths. Fig. IV shows my instrument in its folded position for trying or indicating right angles. Fig. V shows the end of a rule of the usual square form. Fig. VI is a plan of the instrument when folded up for the pocket.

Referring to Figs. I and II, if we divide the straight line X in three parts, respectively $a$, $b$, and $c$, having lengths of proportion three, four, five, and if we position these parts as sides of a triangle, as shown, the angle formed by the part $a$ with the part $b$ is a true right angle. Now if we take a graduated strip—such, for example, as a foot-rule—and joint it at the points $d$ and $e$, as shown in Fig. III, by means of overlapping and riveting in the usual manner of folding rules, it fulfils its functions of a length-measuring rule just as well as if it were jointed at equal intervals in the usual way; but if we now bend this rule at the two points $d$ and $e$ and bring the outer extremities together and fasten them there by a stud and hole or any other equivalent device, as shown in Fig. IV, then we have a true square, by which we can indicate and try right angles. Such an instrument embodies my invention.

In carrying my invention into practice in its preferred form I first make in the usual way a graduated foot-rule with overlapping joints, which differs from the ordinary form merely in that the several pieces of which the rule is composed instead of being of equal length are in so far as their proportional lengths are concerned in the proportion of three, four, five, that the ends of the rule instead of being square (see Fig. V) are beveled off to form acute angles, and that one or other of the pieces $a$ and $b$ shall have at its inner end a right angle.

Referring again to Figs. III and IV, it will be seen that the outer end $f$ of piece $a$ instead of being square, as in Fig. V, is made with an acute angle at its lower edge, while its inner end $g$ is square. It will also be seen that that end of the piece $b$ which is jointed to the piece $a$ is made square, while that end which is jointed to $c$ is made with an acute angle at the lower edge.

In using the term "lower edge" I do so with reference to the instrument when in the open position, as shown in Fig. III. The reason for making those angles acute is that when the instrument is folded into the position shown in Fig. IV we may have not only a right-angled triangle joining the centers of revolution of the three pieces of which the instrument is composed—that is to say, the centers of the rivets and stud—but also a right-angled triangle formed by the outer edges of the three pieces when in the position shown in Fig. IV. For this purpose I make (in the preferred form now under description) the angles at the outer ends of pieces $a$ and $c$ of fifty-two and one-half degrees and the angles overlapping at the end of pieces $b$ and $c$ of thirty-seven and one-half degrees.

It will be noticed that in the preferred form shown in Figs. III and IV the angles at those ends of the pieces which meet are similar in each case. This though advantageous is not necessary, as one of the ends which meet might in each case be of other shape—as, for example, round.

The instrument might of course be otherwise graduated for length than is shown in the figures.

For convenience of folding away for the pocket or in a small case I prefer to have the loose rivets at the two points d and e, the stud at the other end of piece c and projecting rearward, and the hole at the outer end f of piece a. By this arrangement the stud does not come in contact with piece a when folded up. (See Fig. VI.)

In the manufacture of my instrument it is of importance to have the centers of the holes for the rivets and stud (both that in which the stud is fixed and that in which the stud engages) accurately placed in the several pieces. To effect this, I mark the pieces, preferably by a scriber, with a longitudinal median line. Then I measure off the proportional lengths three, four, five on the respective pieces, providing at the same time for the joint lengths at each end, and mark the limits of these proportional lengths by transverse lines made by the scriber. The points at which the median line and the transverse lines cross indicate the centers of the hole to be made.

I desire it to be understood that I do not limit myself to the jointing and connecting methods shown, as any other suitable hinging devices might be substituted for the loose rivets and any convenient form of clip might be substituted for the stud and hole device.

I also desire it to be understood that the joint lengths may in some cases be omitted. Thus if instead of having the pieces overlap we hinged them at their upper edges, as in a well-known form of rule, the pieces and the proportional lengths might be coextensive. This form, however, is not to be recommended, as it leaves angular gaps at the angles when in the position shown in Fig. IV.

What I claim as my invention, and desire to secure by Letters Patent, is—

A measuring instrument foldable into the form of a right-angled triangle, and comprising three pivotally-connected members of properly-proportioned lengths, the opposite ends of each of the members being arranged at an angle to its length, such angle corresponding to the outer or measuring side of the section to which it is connected.

In testimony whereof I have signed my name to this specification in the presence of two subscribing witnesses.

HENRY RICHARDSON PROCTER.

Witnesses:
HAROLD BRUMWELL,
STANLEY HIRST.